(12) United States Patent
Christianson

(10) Patent No.: US 11,585,370 B1
(45) Date of Patent: Feb. 21, 2023

(54) PIN LOCK CARABINER

(71) Applicant: Tony Christianson, Yosemite, CA (US)

(72) Inventor: Tony Christianson, Yosemite, CA (US)

( * ) Notice: Subject to any disclaimer, the term of this patent is extended or adjusted under 35 U.S.C. 154(b) by 0 days.

(21) Appl. No.: 17/962,539

(22) Filed: Oct. 9, 2022

Related U.S. Application Data

(60) Provisional application No. 63/262,592, filed on Oct. 15, 2021.

(51) Int. Cl.
*F16B 45/02* (2006.01)
(52) U.S. Cl.
CPC ................... *F16B 45/029* (2021.05)
(58) Field of Classification Search
CPC .................................................... F16B 45/029
See application file for complete search history.

(56) References Cited

U.S. PATENT DOCUMENTS

| | | | |
|---|---|---|---|
| 6,070,308 A * | 6/2000 | Rohlf | F16B 45/04 24/600.4 |
| 2011/0138586 A1* | 6/2011 | Gompert | F16B 45/02 24/599.4 |
| 2019/0063552 A1* | 2/2019 | Pancutt | F16G 15/02 |

* cited by examiner

*Primary Examiner* — David M Upchurch

(57) ABSTRACT

A spring loaded pin blocks the closed gate's opening path at the location where the gate's opening end engages the carabiner body. The spring serves to normally position the pin so that a portion of the pin protrudes into the opening path of the gate thereby blocking its movement. An open gate pushes the pin aside as it closes. Alternately, the spring can be replaced with a friction member that holds the pin either locked or unlocked when the gate is closed. The gate is unlocked by using a finger to manually push the pin out of the path of the gate end. Although ideally incorporated on wiregate carabiners, the inventive locking mechanism can also be adapted to block the opening end of both straight and bent rigid gate carabiners.

20 Claims, 5 Drawing Sheets

PIN LOCK CARABINER

CROSS-REFERENCE TO RELATED APPLICATION

This application claims the benefit of U.S. Provisional Patent Application No. 63/262,592 filed Oct. 15, 2021, which is incorporated by reference herein in its entirety.

BACKGROUND OF THE INVENTION

1. Field of the Invention

The instant invention is generally related to climbing aids for rock climbers. More particularly, this invention is related to mechanical devices that link climbing aids.

2. Description of the Prior Art

Climbers utilize rope, slings and a variety of mechanical devices as climbing aids to assist and protect their movement over rock. The climbing aids serve as a means to anchor the climber to other climbers or to the rock for the purpose of either preventing or arresting a fall.

A carabiner is a mechanical device used to link rope, slings and other climbing aids together. For example, a carabiner is used to attach a climber's harness to the climbing rope. It is also used to link the climbing rope to anchors placed in or over the rock.

A typical carabiner is palm sized, and either an oblong, oval or "D" shaped ring of a lightweight, high strength material, usually a heat-treated aluminum alloy. One side of the carabiner has a hinged arm that serves as an inward opening gate. The gate is spring loaded to remain normally closed. The normally closed, inward opening gate facilitates insertion of climbing aids such as rope, but impedes inadvertent removal. Objects are released from the carabiner after manually pushing open the gate.

Traditional carabiners utilize a rigid gate with the closing force provided by a stout compression spring that is housed within the gate. The spring axis is offset from the pivot pin so that the spring force is directed to close the gate. A link transfers the spring force to the carabiner body at an appropriate distance from the pivot pin.

The opening end of the traditional rigid gate incorporates an interlocking mechanism that engages the carabiner body when the gate is closed. The interlocking mechanism is typically a transverse pin that mates with a hooked notch in the carabiner body. Another popular configuration includes a keyed arrangement that mates with the carabiner body. These interlocking arrangements allow a closed gate to carry part of the load imposed on the carabiner. Consequently, the carabiner is significantly stronger when the gate is closed. The ultimate strength of a carabiner with the gate open is typically 65% lower than with the gate closed.

A popular alternative to the traditional rigid gate, wiregate carabiners utilize an elongated loop of spring-wire to serve as the carabiner gate. The wire loop legs are bent nearly parallel and have slightly unequal lengths. The staggered ends of the wire loop are also bent 90-degrees inward. During assembly the wire loop must be slightly distorted for the ends to pass through correspondingly offset holes in the body of the carabiner. Distorting the wiregate causes a cantilever-like spring force that holds the gate normally closed. Pushing the wiregate open additionally twists the wire which increases the spring force working to close the wiregate.

As with the traditional rigid gate, the closed end of a wiregate is configured to engage a hooked notch in the carabiner body. Consequently, a typical wiregate carabiner has the same strength as the traditional rigid gate configuration.

Wiregate carabiners have several advantages over the traditional rigid gate. Wiregate carabiners weigh significantly less than the traditional rigid gate carabiner. Furthermore, a wiregate consists of only one part, whereas a traditional rigid gate has at least four (4) parts: bar, internal spring, spring push pin, and pivot pin. The inherent simplicity of the wiregate makes it less prone to problems of contamination or icing. As a disadvantage, the prior art does not have a means to lock a wiregate closed, whereas there are several methods available to lock a traditional rigid gate closed.

During a climb and especially in the event of a fall, the climber's safety is dependent on the security of numerous carabiner links. It is imperative that every carabiner in the chain be able to withstand not only the weight of the climber but also the inertial forces generated when the rope arrests a fall.

As the climber progresses upward, the carabiners in a protective chain of climbing aids often rub against the rock. Occasionally, a carabiner gate will catch on a rock or other object, or the rope itself, and may be pushed or pulled open without the climber's knowledge. Traditional rigid gate carabiners can slap against the rock during a fall causing inertial forces that overcome the closing force of the spring and momentarily open the gate. Also, a rope moving rapidly through a traditional rigid gate carabiner during a fall can cause the carabiner body to vibrate sufficiently to shake the gate open.

Whenever the gate is opened, even momentarily, there is significant risk that a rope or other attached climbing aid will be inadvertently released. Furthermore, if a sudden load is applied to the carabiner at the instant that the gate is open, the ultimate strength of the carabiner will be significantly compromised and possibly fail. Such occurrences are well known by the climbing community and are considered a significant problem. Consequently, climbers pay careful attention to the placement and orientation of carabiners in order to minimize the chance of an inadvertent opening of the gate.

Climbers often use two carabiners joined by a short length of looped webbing, a combination called a quickdraw. One of the quickdraw carabiners is clipped to an anchor placed in or on the rock. The other quickdraw carabiner is clipped to the climber's rope. The quickdraw allows the rope to pull toward the centerline between staggered anchors thereby providing a less resistive path from the belay point to the climber.

A quickdraw requires the use of two carabiners to attach a rope to a single anchor. Assembling a quickdraw with smaller, lightweight carabiners minimizes the weight and bulk penalty of using two carabiners. Wiregate carabiners are especially popular for quickdraw configurations because they weigh less.

A properly placed quickdraw may have the additional benefit of reducing the chance of an inadvertent opening of the gate. Unfortunately this is often not the case. For example, if the rope is incorrectly threaded through the carabiner, a moving rope can twist the carabiner and expose the gate to a sideward opening force. If the rope is pulled across or around the gate, the gate can be inadvertently opened A climber must be very careful when placing and clipping into a quickdraw. The dangling carabiner (the carabiner that will be clipped to the climbers rope) must be oriented so that its gate is away from the rock face. When the rope is clipped in, it must run along the spine of the carabiner, not across the gate.

Many traditional carabiners have a bent rigid gate to facilitate clipping the rope. The gate center is bent inward slightly which serves to guide the rope to the opening end. The dangling carabiner of traditional quickdraw configurations customarily has a bent gate.

Placing the rope into the quickdraw's dangling carabiner requires skill and dexterity. Usually the climber is hanging on to the rock surface with one hand, and has only one hand free to clip in the rope. Depending on which hand is free, and the location and orientation of the carabiner relative to the climber, a variation of two techniques is typically used: 1. The carabiner is stabilized with the middle finger, and the rope is clipped in with the thumb and index fingers; or 2. Stabilize the carabiner with the thumb, and clip the rope using the index and middle fingers. No matter the technique used, the carabiner gate must open easily and without hesitation.

There are situations where the risk of an inadvertent opening of the gate is unacceptable, For example, the carabiner used to attach the climbing rope to the climber's body harness must never open inadvertently. Similarly, the carabiner used to attach a belay device to the climber's harness must never open inadvertently. Consequently, harness attachments and the like require greater security, for example, two parallel carabiners or a single carabiner with a locking gate.

Greater security can be obtained by using two carabiners side-by-side with the gates opening in opposite directions. However, extra carabiners solely for the purpose of parallel placement are undesirable because they double the weight and bulk that the climber must carry.

To avoid the need for side-by-side carabiners, various mechanical means have been developed to directly lock the traditional carabiner gate closed. For example, a popular locking configuration incorporates a sleeve that is threaded, nut like, to the traditional rigid gate. The sleeve can be screwed along the length of the gate, either toward the hinge, or toward the opening end. The sleeve is screwed into the locking position after the rope or other climbing aids have been clipped into the carabiner. In one configuration the gate is locked closed by screwing the sleeve until it crosses the opening end of the gate and jams against the adjacent body of the carabiner. In an alternate configuration the gate is immobilized when the sleeve is screwed over the hinge. Locking or unlocking a carabiner with a threaded sleeve is not instantaneous, that is, it takes time to manually thread the sleeve from the unlocked position to the locked position and the reverse. These locking means cannot be applied to a wiregate carabiner.

Threaded locking sleeves undesirably add bulk and weight to the rigid gate carabiner. Threaded locking sleeves are also inherently troublesome. The threads can become clogged with dirt or ice. The sleeve can inadvertently screw out of the locked position when the carabiner rubs across the rock. Furthermore, the gate and threaded sleeve mechanism require precise machining and assembly alignment, both of which add to manufacturing cost.

Other solutions of the prior art include rigid gates equipped with spring loaded sliding and/or rotary sleeves. Sliding and/or rotary sleeves function similarly to threaded sleeves, and are often designed to lock automatically and nearly instantaneously when the gate closes. Sliding and rotary sleeves share the same problems as threaded sleeves, and are especially costly to manufacture.

The increased bulk, weight and cost of the prior art limits the number of locking carabiners that a climber carries during a climb or is willing to buy. Consequently, there may be situations during a climb when the climber is compelled to use a non-locking carabiner although a locking type would be preferable or safer.

Although the security of quickdraw applications would benefit from the use of locking carabiners, quickdraw configurations do not incorporate locking carabiners because state-of-the-art locking carabiners are relatively heavy and bulky and are not easily opened. The need to be able to easily and instantly clip a rope using only one hand make spring-loaded auto-locking gates especially inappropriate for quickdraw use. Furthermore, locking sleeves can only be mounted on straight gates, whereas most quickdraw configurations preferably utilize at least one bent gate carabiner or a wiregate carabiner.

The instant invention is a locking mechanism especially applicable to wiregate carabiners, and significantly, very little or no weight and bulk is added to the carabiner by the locking mechanism. The instant invention incorporates a locking mechanism that securely, reliably and automatically locks a wiregate carabiner closed and is easily unlocked one-handed by pushing a short pin with a fingertip. Furthermore, compared to state-of-the-art locking means, the instant invention is less susceptible to jamming by contamination and is significantly less costly to manufacture.

SUMMARY OF THE INVENTION

A spring loaded pin blocks the closed gate's opening path at the location where the gate's opening end engages the carabiner body. The spring serves to normally position the pin so that a portion of the pin protrudes into the opening path of the gate thereby blocking its movement. The pin and its spring are coaxially mounted in a hole located in the nose of the carabiner body, the hole's longitudinal axis is oriented to intersect the longitudinal axis of the closed gate at approximately a 45-degree angle. Mounting the pin at an appropriate angle enables the protruding part of the pin to be pushed aside into the carabiner body by the opening end of the gate as it closes. In one configuration the pin spring force is chosen so that the pin will be automatically moved aside by only the force of the closing gate, and when the gate is completely closed the spring loaded pin instantly returns to block opening movement. The carabiner gate can be configured to remain unlocked until the gate is manually pushed to the locked position by choosing a pin spring force that is not overcome by the force of the closing gate. Alternately, the spring can be replaced with a friction member that serves to enable pin movement and holds the pin either locked or unlocked when the gate is closed. The gate is unlocked by using a finger to manually push the pin into the carabiner body, out of the path of the gate end. Advantageously, the gate can be conveniently unlocked and opened with the fingers of one hand, one finger pushing the pin while another finger opens the gate. Although ideally incorporated on wiregate carabiners, the inventive locking mechanism can also be adapted to block the opening end of both straight and bent rigid gate carabiners.

BRIEF DESCRIPTION OF THE FIGURES

A detailed description of the invention is made with reference to the drawings wherein like numerals designate corresponding parts in the several FIGS.

DETAILED DESCRIPTION OF THE INVENTION

The following detailed description is of the presently contemplated modes of carrying out the invention. This description is not to be taken in a limiting sense, but is made merely for purposes of illustrating the general principles of the invention.

Figure 1:
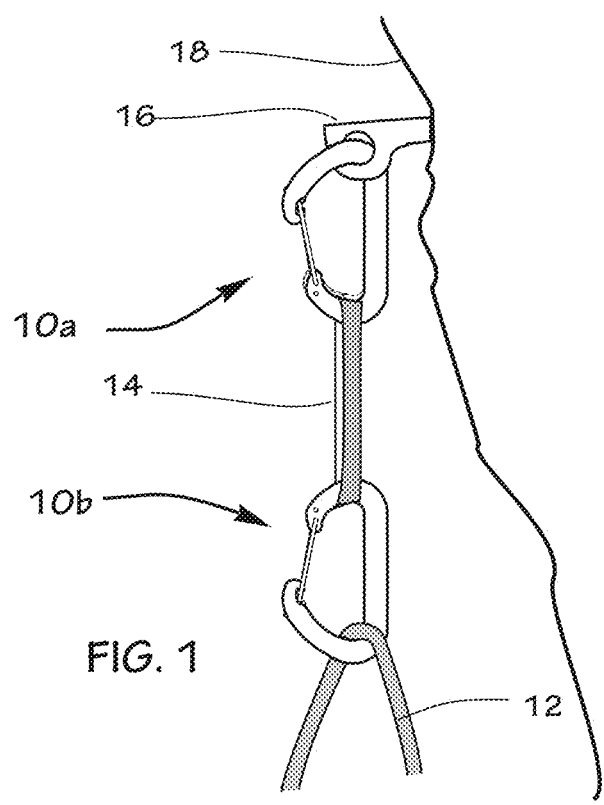
FIG. 1 is a pictorial view of a quickdraw configuration featuring inventive locking carabiners linking rope and an anchor.
Figure 2:
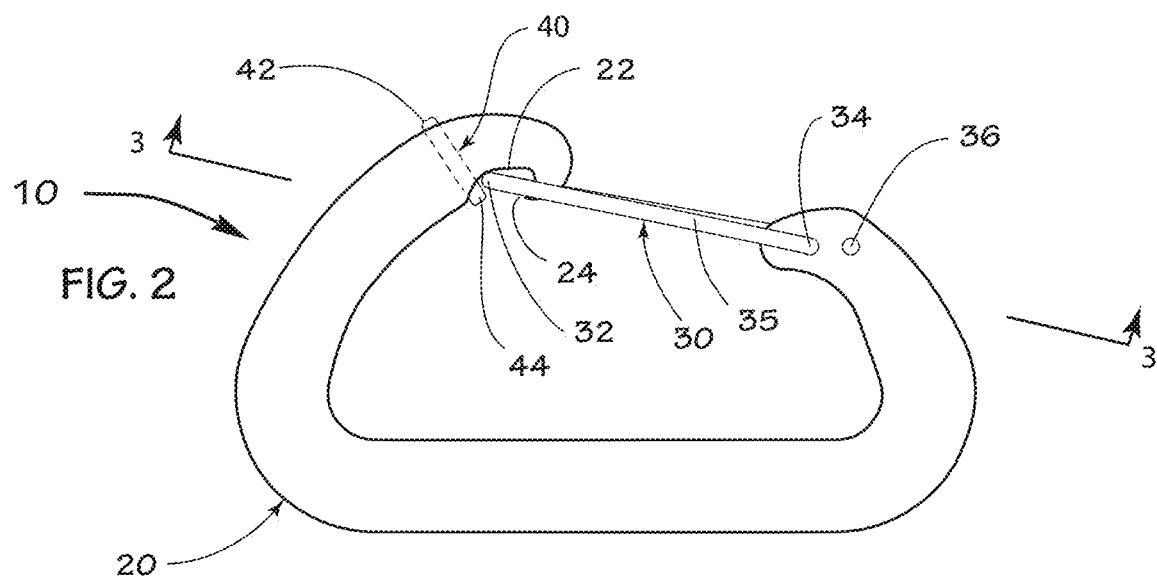
FIG. 2 is a side view of a carabiner incorporating the inventive locking mechanism. The carabiner is shown locked.
Figure 3:
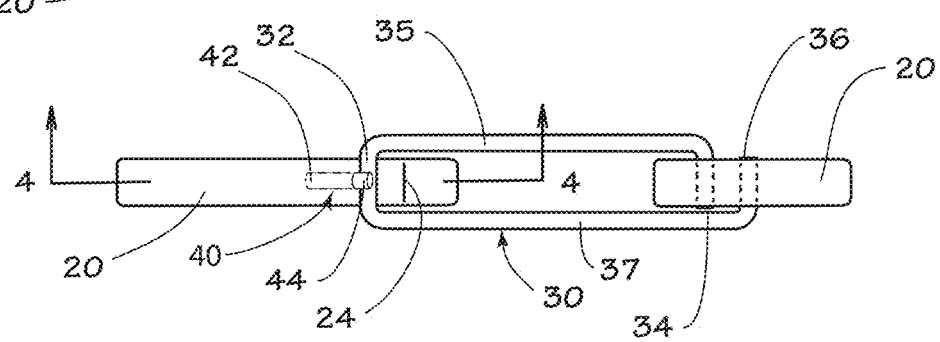
FIG. 3 is a view seen in the direction 3-3 of FIG. 2.

Referring to FIG. 1, carabiners 10*a* and 10*b*, both incorporating the inventive locking mechanism, are shown linked by looped webbing 14 to form a quickdraw configuration. Carabiner 10*a* is clipped to piton 16, which is anchored to a crack in rock wall 18. Carabiner 10*b* is clipped to climbing rope 12. Piton 16 is representative of one of many types of anchors used by climbers. FIG. 1 exemplifies one of the many ways that carabiners are used to link climbing aids together.

Figure 8:
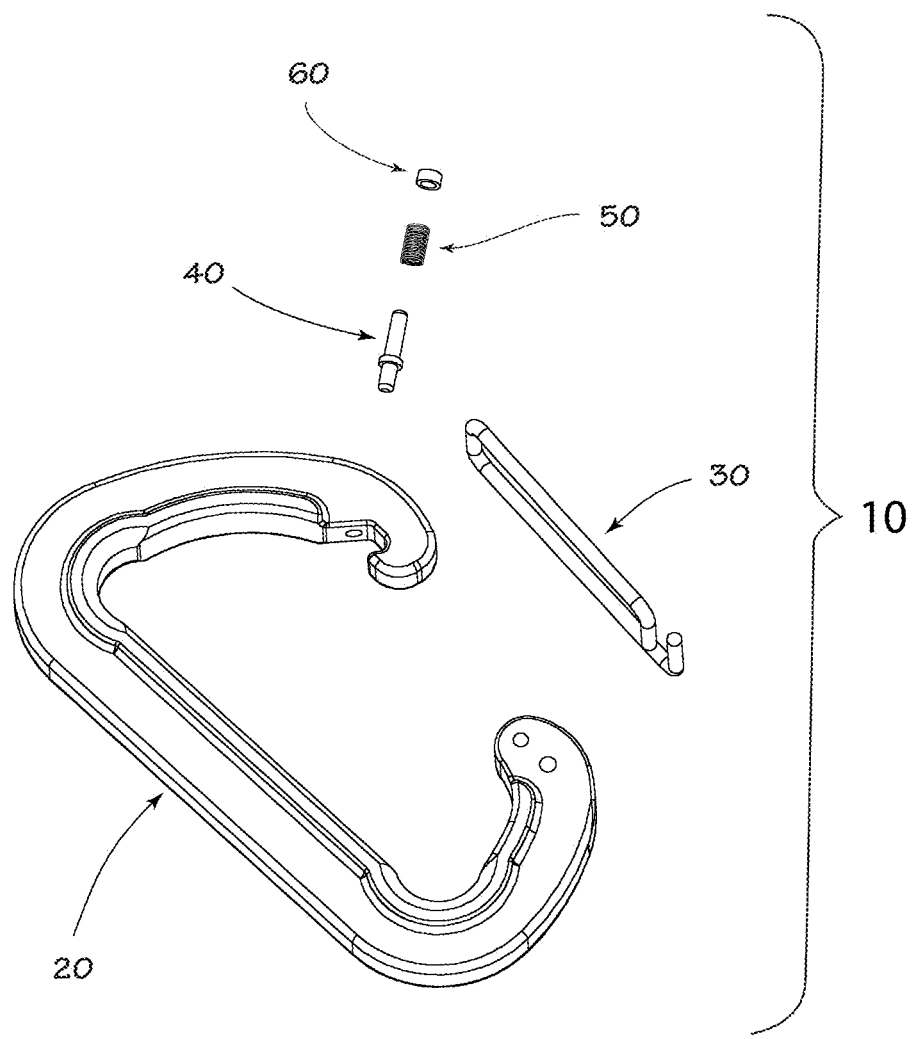
FIG. 8 is an exploded isometric wireframe drawing showing the components of the inventive carabiner.

Referring to FIG. 8, carabiner 10 comprises of body 20, wiregate 30, pin 40, spring 50 and spring keeper 60. Body 20 is typically fabricated from a lightweight, high strength material, for example forged and heat treated aluminum alloy 7075-T6. Wiregate 30 is typically fabricated from spring wire, for example stainless type 302 or 17-7PH. Pin 40 is typically fabricated from bar stock, for example stainless type 303s or a chromium-copper precipitation hardening stainless steel alloy 17-4PH. Spring 50 is fabricated by coiling an appropriate spring wire, for example 17-7PH stainless steel spring wire or an appropriate cobalt-nickel alloy. Spring keeper 60 is typically fabricated from a corrosion resistant material, for example aluminum, brass or stainless steel.

Figure 9:
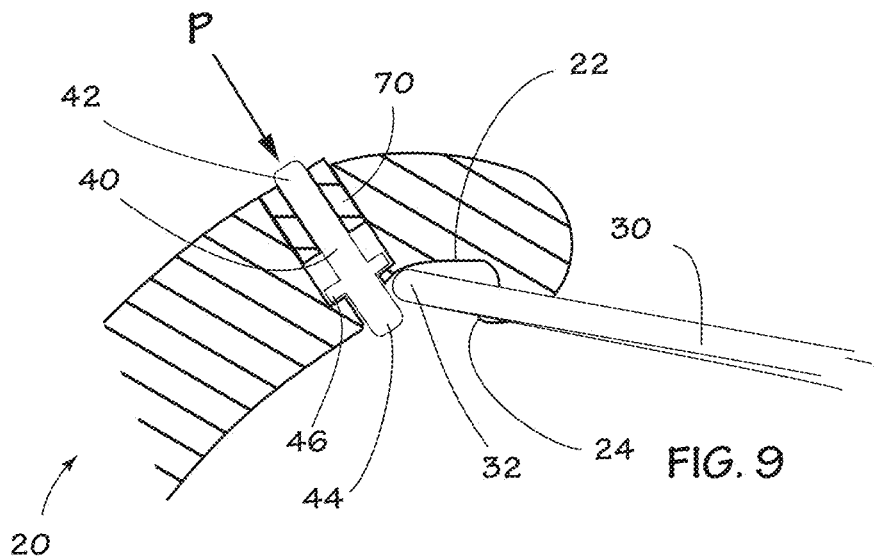
FIG. 9 is close-up side view similar to FIG. 4, but of an alternate configuration. The gate is shown closed and locked.
Figure 10:
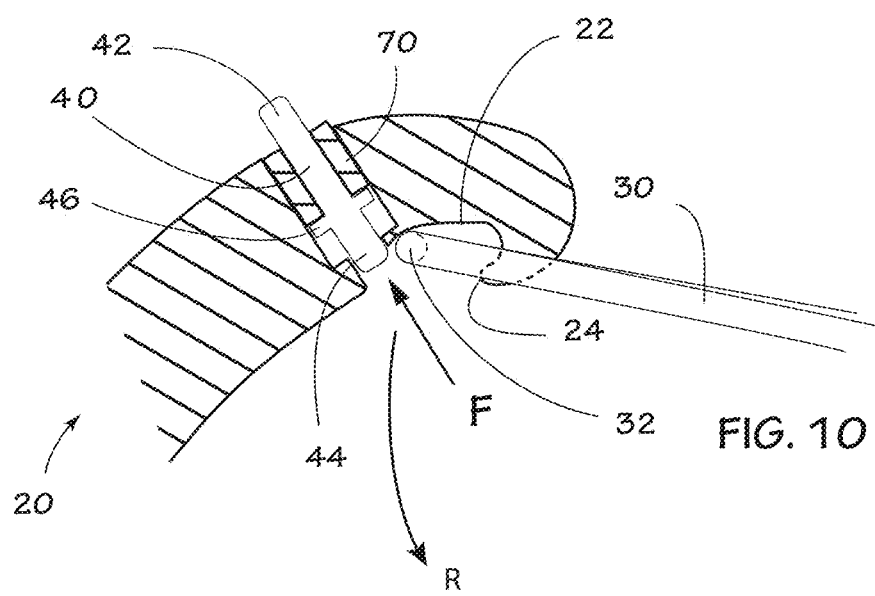
FIG. 10 is close-up side view of the configuration of FIG. 9. The gate is shown closed but unlocked.

A configuration of the inventive locking mechanism is illustrated by FIGS. 2-8. Alternate configurations of the inventive locking mechanism are illustrated by FIGS. 9-10. The terms "top" and "bottom"; "above" and "below"; "right" and "left" refer to the orientation of carabiner 10 shown by FIG. 2.

Gate 30 is an elongated loop of wire having nearly parallel and unequal length legs 35 and 37 (see FIG. 3) joined by looped end 32. The staggered ends of legs 35 and 37 are bent 90-degrees inward to form pivots 34 and 36 respectively.

One side of body 20 has hook-shaped notch 22 with overhanging lip 24. The other side of body 20 has two holes appropriately offset for inserting pivots 34 and 36 of gate 30.

During assembly the legs and looped end of wiregate 30 must be slightly deformed and twisted for the staggered pivot ends to pass through the corresponding holes in body 20. Appropriately twisting the wiregate causes a cantilever-like spring force that holds the gate normally closed. Pushing the gate open additionally twists the wire which increases the spring force working to close the gate. After inserting pivots 34 and 36 into their respective holes, the exposed ends are peened to secure the assembly.

When closed, gate end 32 resides within notch 22 and when body 20 is stretched or distorted by a tensile load, end 32 is captured and retained by lip 24 thereby preventing the loaded gate from opening. Lip 24 does not engage gate end 32 when carabiner body 20 is not stretched or distorted by a load and the resultant clearance enables opening movement of the gate (see arc "A" of FIG. 7).

Figure 4:
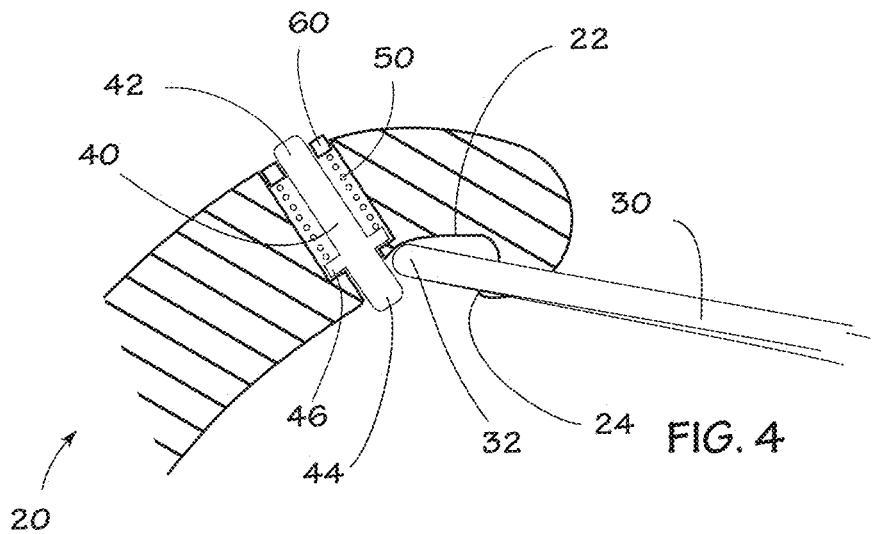
FIG. 4 is close-up side view of the locking component of the inventive carabiner. The gate is shown closed and locked.

Referring to FIG. 4, pin 40 and spring 50 are coaxially mounted in a hole located in the nose of body 20 adjacent notch 22. Spring 50 pushes against pin shoulder 46 to normally hold pin 40 so that end 44 protrudes into the opening path of gate end 32 thereby blocking gate 30's opening movement. The body hole in which pin 40 and spring 50 reside is stepped thereby providing an abutment which limits the travel of pin 40. Pin 40 can have a cross-section selected from a group, but not so limited, consisting of a circular cross-section, an elliptical cross-section, a square cross-section, a rectangular cross section, a hexagonal cross-section and an octagonal cross-section.

Keeper 60 is a short sleeve press fit into the hole opening and serves to retain the spring and pin. Pin end 42 protrudes through a central hole in keeper 60. Alternately, keeper 60 can be an appropriately sized setscrew threaded into the hole opening. Variations of retaining the pin and spring assembly include, but are not limited to, press fit, threads, peening the hole opening, or one or more transverse pins.

Figure 5:
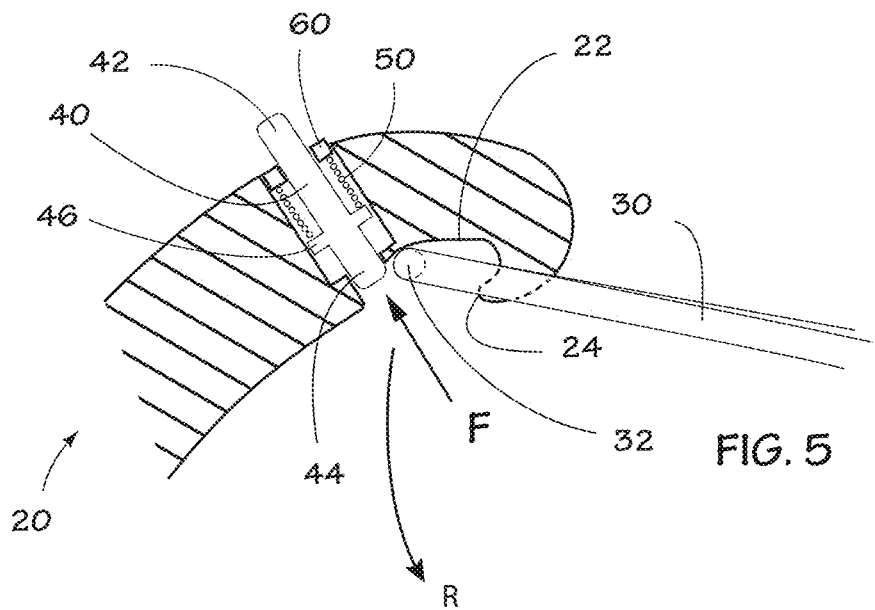
FIG. 5 is close-up side view of the locking component of the inventive carabiner. The gate is shown closed but unlocked.
Figure 7:
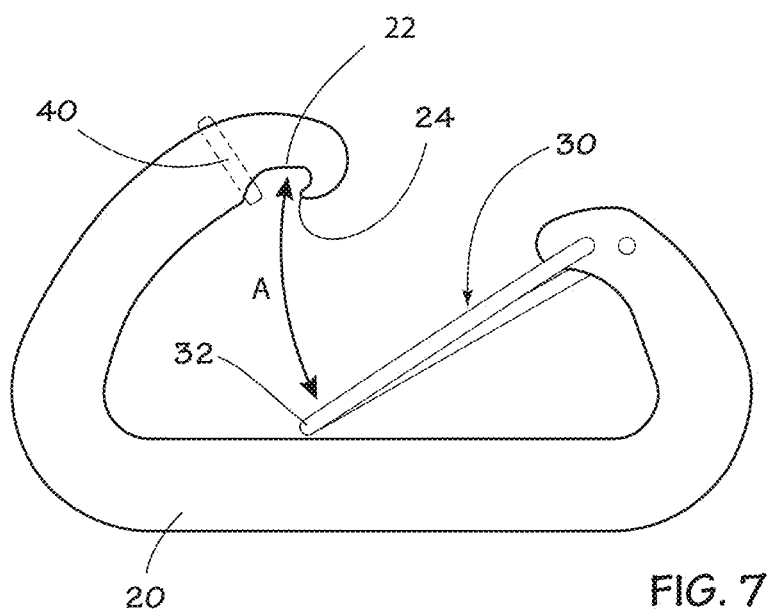
FIG. 7 is a side elevation view of a carabiner incorporating the inventive locking mechanism. The gate is shown fully open.

Referring to FIG. 5, as depicted by arrow "F" the inventive carabiner is unlocked by using a finger to push pin end 44 into body 20, out of the opening path of the gate end 32. Advantageously, the gate can be conveniently unlocked and opened with the fingers of one hand, one finger pushing the pin while another finger opens the gate. The pin can be released when gate end 32 has moved out of the confines of notch 22. FIG. 7 shows the gate fully open and pin 40 extended. Arc "A" represents the opening and closing movement of gate end 32.

Figure 6:
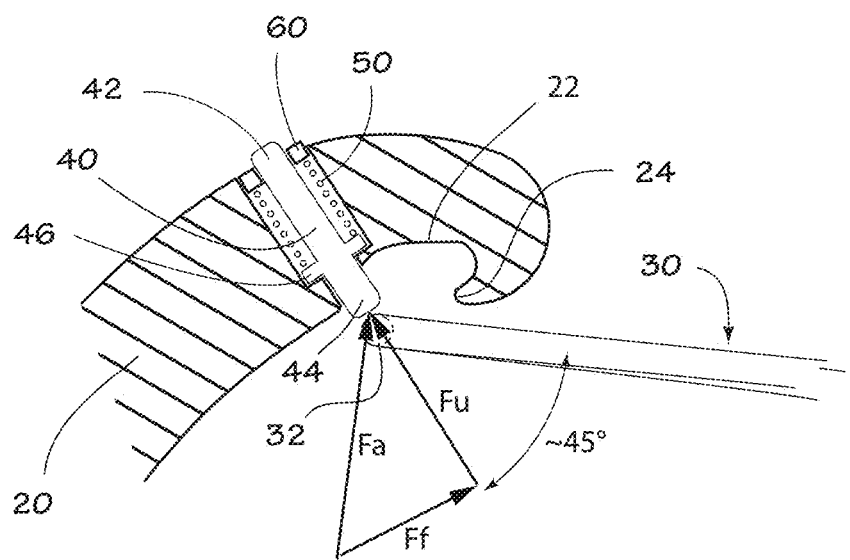
FIG. 6 is close-up side view of the locking component of the inventive carabiner. The gate is shown partially open.

The longitudinal axis of pin 40 and spring 50 are oriented to intersect the longitudinal axis of the closed gate at an angle (shown as ~45° in FIG. 6). Mounting pin 40 at an appropriate angle with respect to gate 30 enables the protruding part of the pin to be pushed aside by gate end 32 as it closes. When it closes, gate end 32 moves past pin end 44 and comes to rest within notch 22. After gate end 32 passes pin end 44, spring 50 forces pin end 44 outward, immediately blocking opening movement of gate 30.

Climbers are often in precarious positions in which only one hand is available to insert a rope into a carabiner (typically the other hand is occupied holding on to another climbing aid or the rock surface). Under such circumstances it is imperative that the carabiner be unlocked and easily opened. The pin must be easily accessed and moved with one finger so that a climber can quickly open gate 30 when needed.

Referring to FIG. 6, arrow Fa represents the gate's closing force provided by the spring action of gate 30 tangental to the arcuate movement of end 32. Ff and Fu are component vectors of Fa with Fu representing the force pushing pin end 44 into body 20. The vector angle is calculated to optimize locking force Fu vs. ease of unlocking. For example when the angle is fixed at greater than 45-degrees, force Fu is increased but pin end 44 may not be optimally oriented for pushing by a finger into body 20. When the angle is fixed at less than 45-degrees, force Fu is reduced but pin end 44 will be better oriented for being pushed by a finger into body 20. Without being so limited, typically the included angle is in the range 45 plus or minus 10 degrees.

In the preferred configuration the compressive force of pin spring 50 is chosen so that the pin will be automatically moved aside by only the force Fu of the closing gate, and when the gate is completely closed the pin instantly returns to block opening movement. By choosing a pin spring force that is not overcome by force Fu of the closing gate, the carabiner gate will be configured so that gate end 32 comes to rest on pin end 44 without pushing it aside thereby remaining unlocked until the gate is manually pushed past pin end 44 to the locked position.

FIGS. 9 and 10 show an alternate configuration of the inventive locking mechanism in which pin 40 is both locked and unlocked manually without the aid of a spring. This configuration allows the inventive carabiner to remain unlocked when the gate is closed. As described supra, pin 40 is mounted in a hole located within the nose of body 20 adjacent notch 22. End 44 of pin 40 blocks the opening path of gate end 32 when pin 40 is in the locked position. Conversely, when pin 40 is in the unlocked position, pin end 44 does not interfere with the opening path of gate end 32 and pin end 42 conveniently protrudes a short distance from body 20. Referring to FIG. 9, pin end 44 has blocked the opening path of gate end 32 after the application of force P against exposed pin end 42. Referring to FIG. 10, pin end 44 has moved out of the opening path of gate end 32 after the application of force F against pin end 44. Force P can be provided by a brief push against pin end 42, for example, with a finger. Force F can be provided by a brief push either with a finger (or the like) or by the closing action of gate 30. Pin 40 is retained by sleeve 70 which is, without being so limited, press fit or threaded into the hole. Sleeve 70 is a resilient material, or the like, having an internal diameter that provides appropriate sliding friction with pin 40 thereby enabling movement of pin 40 and subsequently holding it in either a locked or unlocked position. Furthermore sleeve 70 can be any device that allows movement and subsequent positioning of pin 40. Shoulder 46 limits movement of pin 40 between the hole's bottom abutment and sleeve 70.

Other variations on the shape and/or relative locations of the carabiner body, gate, locking pin, spring and method of retention are contemplated. For example, a pin end may be bent or enlarged to facilitate unlocking movement. Furthermore, although ideally incorporated on wiregate carabiners, the inventive locking mechanism can also be adapted to block the opening end of either straight or bent rigid gate carabiners. These alternate configurations function the same as that of the described configurations. It is understood that those skilled in the art may conceive of other modifications and/or changes to the invention described above. Any such modifications or changes that fall within the purview of the description are intended to be included therein as well. This description is intended to be illustrative and is not intended to be limitative. The scope of the invention is limited only by the scope of the claims appended hereto.

What I claim is:

1. A locking carabiner, comprising:
    a carabiner body having a carabiner nose and a carabiner leg, wherein the carabiner nose comprises a notch having a notch opening;
    an inward opening gate comprising a gate end and a pivot end, wherein the pivot end connects to the carabiner leg and the gate is configured to pivot around the pivot end to move between a closed position, where the gate end resides within the notch, and an open position in which a gap exists between the carabiner nose and the gate end;
    a locking mechanism mounted in the carabiner nose adjacent to the notch, wherein:
        when the inward opening gate is in the closed position, a portion of the locking mechanism is configured to protrude to at least partially obstruct the notch opening and block the gate end from moving past the locking mechanism; and
        the portion of the locking mechanism that at least partially obstructs the notch opening is configured to automatically move aside in response to the gate end contacting the locking mechanism as the inward opening gate moves between the open position and the closed position.

2. The locking carabiner of claim 1, wherein the locking mechanism comprises a pin mounted within a hole in the carabiner nose.

3. The locking carabiner of claim 2, wherein the hole comprises an entrance opening and an exit opening.

4. The locking carabiner of claim 2, wherein the locking mechanism further comprises a spring configured to bias the pin.

5. The locking carabiner of claim 4, wherein the pin further comprises a pin shoulder, where the spring is configured to push against the pin shoulder.

6. The locking carabiner of claim 5, wherein the locking mechanism further comprises an abutment located at the lip of the hole such that the movement of the pin is limited when the pin shoulder contacts the abutment.

7. The locking carabiner of claim 3, wherein the locking mechanism further comprises a retaining element at the entrance opening.

8. The locking carabiner of claim 7, wherein the retaining element is configured to completely close the entrance opening.

9. The locking carabiner of claim 3, wherein the pin is configured to protrude from the exit opening at substantially a 45° angle relative to the longitudinal axis of the gate in the closed position.

10. The locking carabiner of claim 2, wherein the locking mechanism comprises a sleeve mounted within the hole, where the sleeve is configured to receive the pin.

11. The locking carabiner of claim 10, wherein the sleeve is configured so that movement of the pin against the sleeve provides frictional resistance.

12. The locking carabiner of claim 2, wherein the pin has a cross-section selected from the group consisting of: a circular cross-section, an elliptical cross-section, a square cross-section, a rectangular cross section, a hexagonal cross-section and an octagonal cross-section.

13. The locking carabiner of claim 1, wherein the inward opening gate is a wiregate.

14. The locking carabiner of claim 13, wherein the carabiner body further comprises two offset holes.

15. The locking carabiner of claim 14, wherein the pivot end of the wiregate comprises a first leg having a first leg end, a second leg having a second leg end.

16. The locking carabiner of claim 15, wherein the first leg end is configured to pass through one of the two offset holes, and the second leg end is configured to pass through the other of the two offset holes.

17. The locking carabiner of claim 16, wherein the first leg and second leg are parallel.

18. The locking carabiner of claim 17, wherein the first leg and the second leg are unequal in length.

19. The locking carabiner of claim 1, wherein the carabiner nose further comprises an overhanging lip.

20. A locking carabiner, comprising:
- a carabiner body having a carabiner nose and a carabiner leg, wherein:
  - the carabiner nose comprises a hook-shaped notch having a notch opening; and
  - the carabiner leg comprises two offset holes;
- an inward opening wiregate comprising a first leg having a first leg end, a second leg having a second leg end, a gate end, and a pivot end, wherein:
  - the first leg end is configured to pass through one of the two offset holes;
  - the second leg end is configured to pass through the other of the two offset holes;
  - the first leg and the second leg are parallel;
  - the first leg and the second leg are unequal in length;
  - the first leg and the second leg are joined at the gate end;
  - the inward opening wiregate is configured to pivot around the pivot end to move between a closed position, where the gate end resides within the hook-shaped notch, and an open position in which a gap exists between the carabiner nose and the gate end;
- a spring-loaded pin mounted in a hole in the carabiner nose adjacent to the hook-shaped notch, wherein:
  - when the inward opening wiregate is in the closed position, a portion of the spring-loaded pin is configured to protrude at an angle to at least partially obstruct the notch opening and block the gate end from moving past the spring-loaded pin; and
  - the portion of the spring-loaded pin that at least partially obstructs the notch opening is automatically moved aside in response to the gate end contacting the spring-loaded pin as the inward opening gate moves between the open position and the closed position.

* * * * *